United States Patent
Pawgi et al.

(10) Patent No.: US 10,673,823 B2
(45) Date of Patent: Jun. 2, 2020

(54) MIGRATION CONTAINERS

(71) Applicant: Microsoft Technology Licensing, LLC, Redmond, WA (US)

(72) Inventors: Chetan Pawgi, Redmond, WA (US); Avery Morin, Seattle, WA (US); Zachary A. Koehne, Redmond, WA (US); Simon Bourdages, Redmond, WA (US); Joe K. Yap, Sammamish, WA (US); David C. Oliver, Bellevue, WA (US); Roberta Cannerozzi, Bellevue, WA (US); Ron S. Estrin, Bellevue, WA (US); Wenyu Cai, Redmond, WA (US); Hale Zheng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 15/295,710

(22) Filed: Oct. 17, 2016

(65) Prior Publication Data
US 2018/0109501 A1 Apr. 19, 2018

(51) Int. Cl.
*G06F 21/00* (2013.01)
*H04L 29/06* (2006.01)

(52) U.S. Cl.
CPC .......... *H04L 63/0428* (2013.01); *H04L 63/06* (2013.01)

(58) Field of Classification Search
CPC ..... H04L 63/06; H04L 63/0428; H04L 29/06; H04L 9/0822; H04B 5/0031; H04N 1/00766
USPC ........................................................ 713/164
See application file for complete search history.

(56) References Cited

U.S. PATENT DOCUMENTS

| | | | |
|---|---|---|---|
| 8,429,651 B2 | 4/2013 | Donnellan et al. | |
| 8,918,439 B2 | 12/2014 | Alatorre et al. | |
| 8,984,269 B2 | 3/2015 | Ferris | |
| 9,325,791 B1 | 4/2016 | Blahaerath et al. | |

(Continued)

OTHER PUBLICATIONS

Dave, Jay, "Speed Matters—Using the Azure SharePoint Online Migration Pipeline", Published on: Jun. 3, 2015, 9 pages. http://www.metalogix.com/Blog/Blog-Article/metalogix-software-blog/2015/06/03/speed-matters-using-the-azure-sharepoint-online-migration-pipeline.

(Continued)

*Primary Examiner* — Kendall Dolly
*Assistant Examiner* — Kevin Ayala
(74) *Attorney, Agent, or Firm* — International IP Law Group, PLLC (57) ABSTRACT

Various systems and methods for provisioning migration containers are disclosed. A system includes a memory and a processor to generate a migration container and migration metadata. The migration container can store data verified as encrypted with an encryption key and the migration metadata can include a lifespan value indicating a time limit for the migration container. In an example, the system can, in response to a request from a user device, provide the encryption key and a migration container path corresponding to a location of the migration container to the user device. In an example, the system can store data in the migration container in response to detecting the data from the user device via the migration container path. The system can migrate the data in the migration container to a server, and delete the migration container in response to the time limit of the lifespan value being exceeded.

18 Claims, 6 Drawing Sheets

(56) References Cited

U.S. PATENT DOCUMENTS

| | | | |
|---|---|---|---|
| 9,535,629 | B1* | 1/2017 | DeSimone |
| 2012/0117030 | A1 | 5/2012 | Sakuma |
| 2013/0205007 | A1 | 8/2013 | Ayachitula et al. |
| 2013/0282919 | A1 | 10/2013 | Richards, III et al. |
| 2014/0344327 | A1* | 11/2014 | Lovric ............... H04L 67/2804 709/203 |
| 2015/0199379 | A1* | 7/2015 | Thierer ............... G06F 17/301 707/724 |
| 2015/0264014 | A1* | 9/2015 | Budhani ............ H04L 63/0281 726/12 |
| 2016/0294549 | A1* | 10/2016 | Qian .................... H04L 9/0822 |
| 2016/0314307 | A1* | 10/2016 | Kacin ................ H04L 63/0428 |
| 2017/0090786 | A1* | 3/2017 | Parab .................... G06F 3/0619 |
| 2018/0054302 | A1* | 2/2018 | Shveykin ............... H04L 9/083 |
| 2018/0176771 | A1* | 6/2018 | Yang .................... H04L 9/0819 |

OTHER PUBLICATIONS

Bigelow, Stephen J., "How does AWS support storage lifecycle management?", Published on: Aug. 2016, 8 pages. http://searchaws.techtarget.com/answer/How-does-AWS-support-storage-lifecycle-management.

"Using Oracle Database Cloud—Database as a Service", Retrieved on: Aug. 24, 2016, 5 pages. https://docs.oracle.com/cloud/latest/dbcs_dbaas/CSDBI/GUID-90E792E1-EC2D-42B4-976E-375485C2A44A.htm#CSDBI-GUID-90E792E1-EC2D-42B4-976E-375485C2A44A.

Aldiab, Motasem, "Public Cloud War: AWS vs Azure vs Google", Published on: Mar. 4, 2015, 13 pages. http://cloudacademy.com/blog/public-cloud-war-aws-vs-azure-vs-google/.

"Object Lifecycle Management", Published on: Dec. 28, 2014, 8 pages. https://cloud.google.com/storage/docs/lifecycle.

"SharePoint Online and OneDrive Migration User Guide", Published on: Aug. 11, 2015, 9 pages. https://technet.microsoft.com/en-us/library/mt203923.aspx.

Raza, Sohail, "SharePoint New Migration API", Published on: Sep. 17, 2015, 8 pages. https://www.linkedin.com/pulse/sharepoint-new-migration-api-sohail-raza?forceNoSplash=true.

* cited by examiner

MIGRATION CONTAINERS

BACKGROUND

A cloud refers to a network of remote servers hosted on the Internet and used to store, manage, and process data in place of local servers or personal computers. Servers and other resources can include certain configurations, software, and features, and can be updated based on newer versioning in software or by user preference. Multiple resources can be pooled together and can be referred to collectively as a farm. A user can use a farm individually or groups of users can share use of a farm. A farm can be one of many farms in a data center, where there may be several data centers in a geographical region. Data stored in memory storage, including local storage, cloud storage, network area storage, or other storage configurations can be transferred to a farm.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for provisioning a migration container including a memory and a processor to generate a migration container and migration metadata. In an example, the migration container can store data verified as encrypted with an encryption key and the migration metadata can include a lifespan value indicating a time limit for the migration container. In an example, the system can, in response to a request from a user device, provide the encryption key and a migration container path corresponding to a location of the migration container to the user device. In an example, the system can store data in the migration container in response to detecting the data from the user device via the migration container path. The system can migrate the data in the migration container to a server, and delete the migration container in response to the time limit of the lifespan value being exceeded.

Another embodiment provides a method for provisioning a migration container including generating a migration container and migration metadata. In an example, the migration container can store data verified as encrypted with an encryption key and the migration metadata can include a lifespan value indicating a time limit for the migration container. In this embodiment, the method can, in response to a request from a user device, provide the encryption key and a migration container path corresponding to a location of the migration container to the user device. This embodiment further provides that the method can store data in the migration container in response to detecting the data from the user device via the migration container path. This method can include migrating the data in the migration container to a server, and deleting the migration container in response to the time limit of the lifespan value being exceeded.

Another embodiment includes a tangible, computer-readable medium comprising instructions that, in response to an execution by a processor generate a migration container and migration metadata. In an example, the migration container can store data verified as encrypted with an encryption key and the migration metadata can include a lifespan value indicating a time limit for the migration container. The embodiment also can include instructions that when executed on a processor, and in response to a request from a user device, provide the encryption key and a migration container path corresponding to a location of the migration container to the user device. The embodiment also can include instructions that when executed on a processor, stores data in the migration container in response to detecting the data from the user device via the migration container path. The embodiment also can include instructions that when executed on a processor migrates the data in the migration container to a server, and delete the migration container in response to the time limit of the lifespan value being exceeded.

BRIEF DESCRIPTION OF THE DRAWINGS

The following detailed description may be better understood by referencing the accompanying drawings, which contain specific examples of numerous features of the disclosed subject matter.

DETAILED DESCRIPTION

This disclosure may refer to a cloud-based service that can provide user facing applications for interacting with the cloud. This disclosure also refers to a cloud-based management system that operates without direct exposure to the user but provides backend management of the cloud.

During data migration to a cloud or during data migration performed on a cloud, a user may utilize temporary storage. As used herein, migration can refer to sending or transmitting data, and can include the movement of data from not only between physical locations but also user accounts regardless of physical location or device. Previously, a user seeking temporary storage had to manually obtain the temporary storage as well as manually manage the lifecycle and security constraints for the temporary storage.

The techniques disclosed herein allow the user to fetch keys of migration containers automatically. As used herein, migration containers refer to temporary containers that can be used for data migration. A migration container can enforce encryption, by refusing to store unencrypted data. Through enforcement of encryption, the cloud-based service may not be able to gain access to the data written into the storage account. Further, a migration container may have a lifespan that automatically expires causing the migration container to destruct and causing the deletion of data stored within the migration container.

The techniques herein describe how a cloud-based service can provide automatic data migration to a cloud-based management system through use of a migration container and a queue. In part, this can be accomplished with a migration container application program interface (API).

The migration container API can allow a user to use a cloud-based management system's migration container as a temporary storage. In an example, the cloud-based management system may refuse to accept a migration job, including storing migration data in migration containers. The refusal to perform a migration job can be the result of the request from a cloud-based service being unencrypted. Similarly, the refusal to perform a migration job can be the result of an identification that the data to be migrated is unencrypted.

In an example, the cloud-based management system can pre-provision the migration containers for a user, such that the containers are created prior to a user request for the containers. When pre-provisioned migration containers are used, the user can instead be provided a key that allows access to the migration container. The provision and pre-provision of migration containers to a user by a cloud-based service may eliminate a user demand for third-party, manually installed, or self-run temporary storage containers.

In some cases, and to enhance security, the migration container and migration queues can be used once per request and not reused after. In this example, once a migration container is assigned to a user this migration container may not be reused or shared. Further, after completion of a migration job or a lifespan of the migration container, the migration container and migration queue can be automatically deleted. The lifespan of the migration container can be set by the cloud-based service, and can include a variety of time frames. A migration container lifespan can be longer than 30 days. A migration container lifespan can be longer than 90 days before destruction of the migration container and deletion of any data stored within the migration container.

As discussed above, servers and other resources can include certain configurations, software, features. Multiple resources can be pooled together and can be referred to collectively as a farm. A farm can be one of many farms in a data center, where there may be several data centers in a geographical region. In data migration, the cloud-based service can generate migration containers in a number of geographical regions. The generation of farms in a variety of geographic regions can be prior to a user request for the migration container. The cloud-based service can respond to a migration job request by providing the user with access to a migration container in specific geographical region. In an example, the geographical region of the migration container can be the same geographical region as the data the user intends to migrate. The user may have a primary user account associated with a particular farm, data center, or region and the cloud-based service can provide a migration container co-located to match the location of a primary user account. A migration queue can also be located specific to a data center in a specific geographical region, and can be assigned to a user based on its geographical region by the cloud-based service.

Using the techniques disclosed a user may initiate a request for a migration container from a local machine to the cloud-based service. In an example, the request for a migration container can be a client-side object model (CSOM) call. As more fully shown in FIG. 1, the cloud-based service can respond to the request for a migration container by provisioning a storage container and returning credentials to be used by the user in creating and submitting a migration job.

Figure 1:
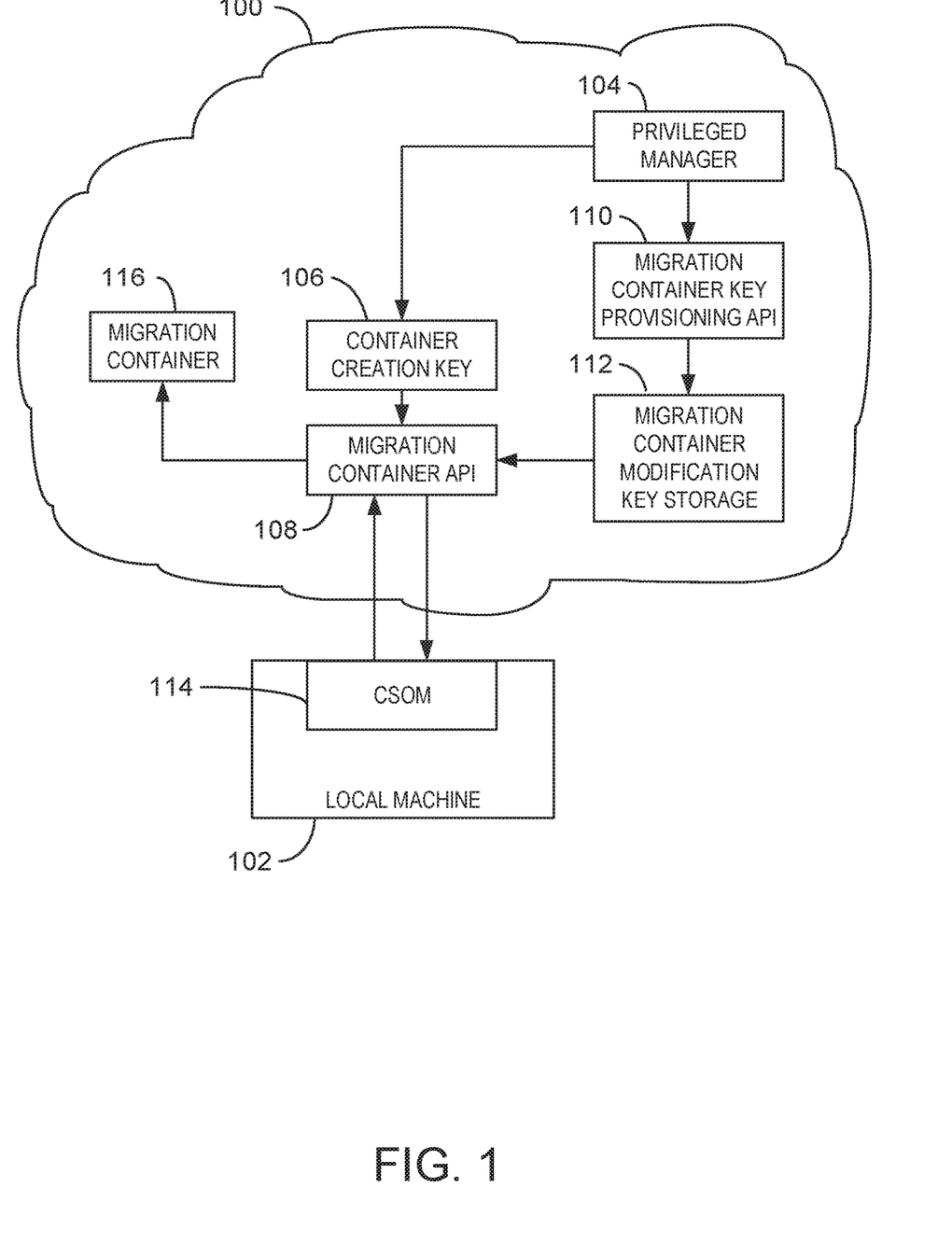
FIG. 1 shows a schematic diagram for pre-provisioning and deploying migration containers.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 shows a schematic diagram for pre-provisioning and deploying migration containers. The cloud 100 can interact with a local machine 102, where the local machine 102 is local to a user. As discussed above, the cloud 100 can include a number of resources and machines, some of which have privileges to create keys and manage where the keys are deployed. A key can include a token, a signature, a shared access signature (SAS), and other similar authenticators. A privileged resource or device with the power to create and manage keys are referred to herein as a privileged manager 104. In FIG. 1, the privileged manager 104 can create a container creation key 106 that is sent to a migration container API 108.

The privileged manager 104 can call a migration container key provisioning API 110 to generate and write a migration container modification key for storage in a migration container modification key storage 112. The migration container modification key can grant create, write, access, and deletion privileges on data held in a specified migration container.

When a user wishes to gain access to a migration container the user may make a request for a migration container through a client-side object model (CSOM). The request for a migration container can be made from the CSOM 114 to the migration container API 108. In response to the request for a migration container, the migration container API 108 can request a migration container modification key from the migration container modification key storage 112. In response to the request from the migration container API 108 the migration container modification key storage 112 may return a modification key for a migration container. In an example, the migration container modification key storage 112 may return a modification key to a random migration container API 108. In an example, the migration container modification key storage 112 may return a modification key to the migration container API 108 based on the geographic region of an account of the user.

The migration container API 108 can use the container creation key 106 to create a migration container 116. An encryption key, such as an advanced encryption standard (AES) key including an AES256 key, can be created at the same time we the migration container is created. In an example, this encryption key is unrelated to the container creation key 106. Instead, the hash of this encryption key, such as the hash of an AES256 key, can be stored in the migration container metadata in order to verify the migration container later when a user submits job with both a migration container and the encryption key.

Once the migration container 116 or several migration containers 116 have been created, the migration container API 108 can identify a means of addressing migration container 116. The means of addressing the migration container 116 can include a remote address, a container path, or any other means that provides and access route that can be provided to the user.

Additionally, the migration container API 108 can pre-provision the migration containers 116 based on container creation keys 106 previously received. Pre-provisioning allows the creation of the migration containers 116 prior to a user request for access to the migration container. If a migration container 116 has been pre-provisioned, the migration container path may already be known to the migration container API 108 prior to a request for a migration container 116.

The migration container API 108 possessing a migration container path and a corresponding migration container modification key can return them as a reply to the request from the CSOM 114. If the migration containers 116 are pre-provisioned, then the reply time to an initial request for access to the migration container can be decreased.

Although FIG. 1 shows creation and distribution of migration container keys, the privilege manager 104 of the cloud-based management system can also establish and pre-provision key containers for migration queue keys. The keys can be named using use date-based naming conventions. In an example, each day a number of read-write key names can be pre-generated to become migration container names as the key names can be globally unique identifiers (GUIDs). This naming mechanism can ensure that while containers are provided in a particular day, future container keys can be provisioned by the system and automatically avoid any naming or supply contention.

Additional keys can also be generated by the privilege manager 104 including a service key that can grant permission to read key storage such as the migration container modification key storage 112 or other similar key storage. An alert can be made in response to a cloud-based management system detecting that the cloud-based management system is attempting to support too many containers and queues. The number of containers and queues to be supported can be determined based aggregation and by subscription limits. In an example, a cloud-based management system can detect that a certain number of containers and queues are generated in a given day. As discussed above, the naming conventions and generation process becomes important here because counting containers provisioned on a day is can be done using Date prefix. For example, the migration container names are the Date followed by a GUID. If too many containers and queues are generated, then container and queue creation keys may be compromised due to date based naming schemes, for example. Accordingly, alerts in systems with date based naming schemes can alert if a threshold number of created containers and queues is exceeded in a set time period.

An alert can be made based on an identification of container and queue size reaching a threshold limit. In an example, the cloud-based management system logs can identify sizes of the containers and queues. In response to the cloud-based system management logs showing a threshold of empty containers and queues has been exceeded, an alert describing the issue can be indicated in provisioning code to a user, and to a cloud-based service operator. These alerts can ensure proper function of the migration container system as well as ensuring that the users are utilizing the system and migration API 108 as expected.

Figure 2:
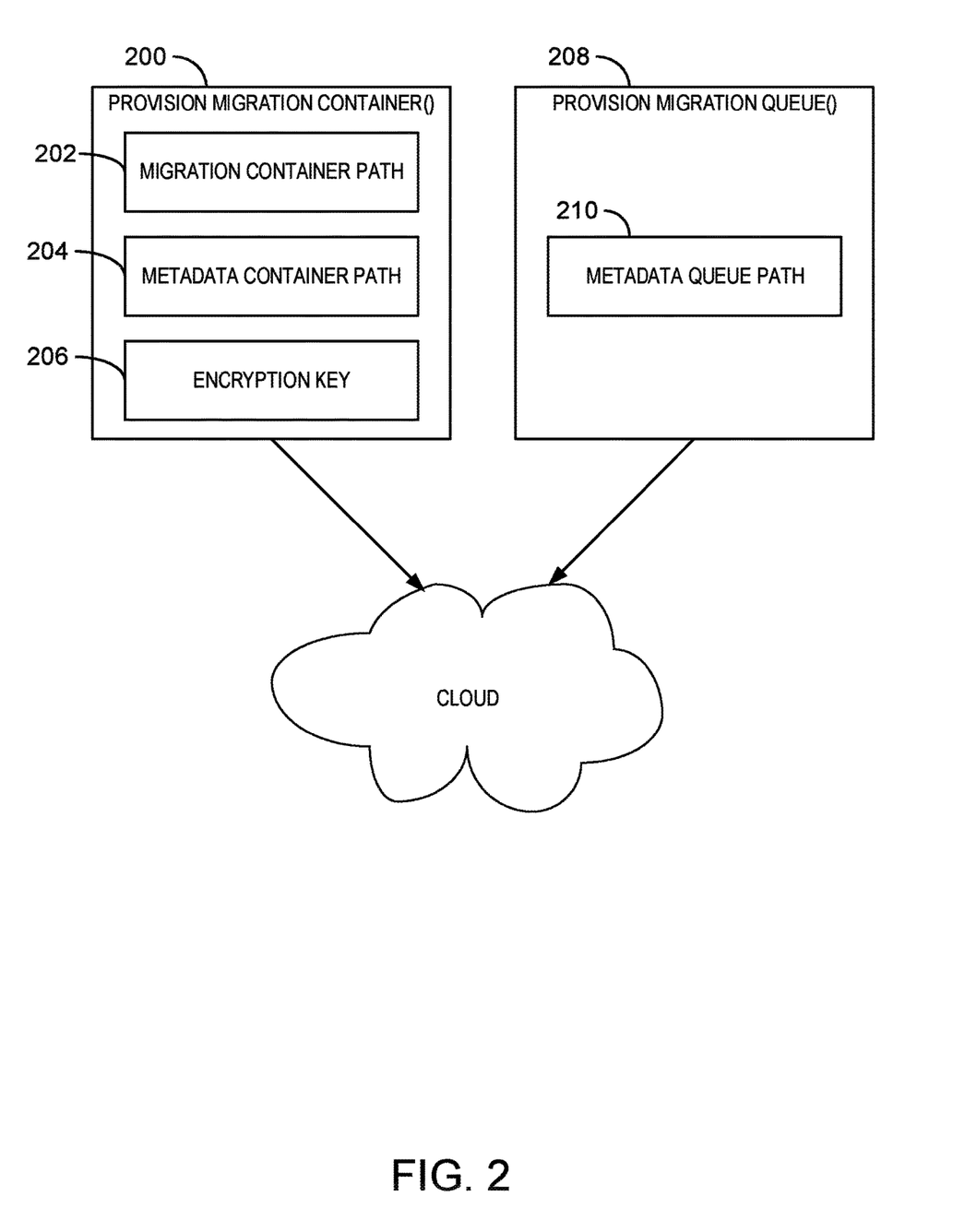
FIG. 2 shows a schematic diagram showing container and queue calls, the returned objects in relation to a migration.

FIG. 2 shows a schematic diagram showing container and queue calls, the returned objects in relation to a migration. While certain figures are shown as specific calls or named requests, other requests performing the same or similar operations are contemplated.

From a user perspective, a migration container and migration queue can be used to initiate an encrypted migration job.

The encryption migration job can be used to move data from a user storage to a cloud service. Similarly, the encryption migration job can be used to move a user's data from one cloud service to another or from one account or account location in a cloud service to another account or account location.

As shown in FIG. 1, a user can make a request for a migration container to a migration container API 108. This request can be an object call made by a CSOM. In FIG. 2, the ProvisionMigrationContainers( )call 200 requests the provisioning of a migration container. In response to this request, the migration container API 108 can return a migration container path 202, a metadata container path 204, and an encryption key 206. As used herein, path can refer to a uniform resource identifier, a uniform resource location, or any other addressing convention for locating the particular resource.

The migration container path 202 can be a string indicating an accessible route to a migration container located in a cloud. The migration container path 202 can be a key token that is presented at a cloud-based service for access to the migration container. The metadata container path 204 can be a string indicating an accessible route to metadata for the migration container located in a cloud. The metadata container path 204 can be a key token that is presented at a cloud-based service for access to the metadata container. The metadata container can include metadata about the migration container including a lifespan of the container, an encryption key hash, and the hash of the key used to create the migration container. The encryption key 206 can be a key, a key hash, or a byte array for an encryption algorithm. In an example, the byte array can be for an advanced encryption standard (AES) including AES256CBC encryption. The encryption key 206 is used to encrypting the data being migrated through a migration container.

While the cloud-based service can provide the encryption key 206, the cloud-based service forgets the encryption key 206 once the encryption key 206 is provided to a user. The user may store the encryption key and provide the encryption key 206 when making a migration job call.

The ProvisionMigrationQueue( )call 200 requests the provisioning of a queue path. In response to this request, the migration container API 108 can return a migration queue path 210. The migration queue path 210 can be a string indicating an accessible route for accessing the cloud-based management system queue. In an example, the migration queue path 210 can be reused across multiple migration jobs requests, which can reduce the number of times this call is made.

After a user has received responses for the provision migration container call 200 and the provision migration queue call 208, the user can upload to the migration containers to the cloud 100. During the user upload of data for migration, several parameters are passed by the user to the cloud-based management system. The passed parameters can include the migration container path 202 and providing the migration container modification key. The passed parameters can include the metadata container path 204 which can also be modified by the migration container modification key. The passed parameters can include the migration queue path 210 and the encryption key 206. As discussed above, this encryption key can be the container creation key 106 used to create the migration container.

In response to the user upload to the cloud 100, the user can call for initiating the encrypted migration. The cloud-based management system can execute similar actions for both the migration container and the metadata container. The user-provided keys can be compared to the hashes of the migration container and a hash stored for the metadata container. If there is no match, between the container hash and a user hash generated from a key, then no data may be transferred. Otherwise, if there is a match of hashes, access and storage rights are provided to the migration container and the metadata container. When access to the migration container is granted, the migration queue path 210 is used for further migration processing from the migration container.

Figure 3:
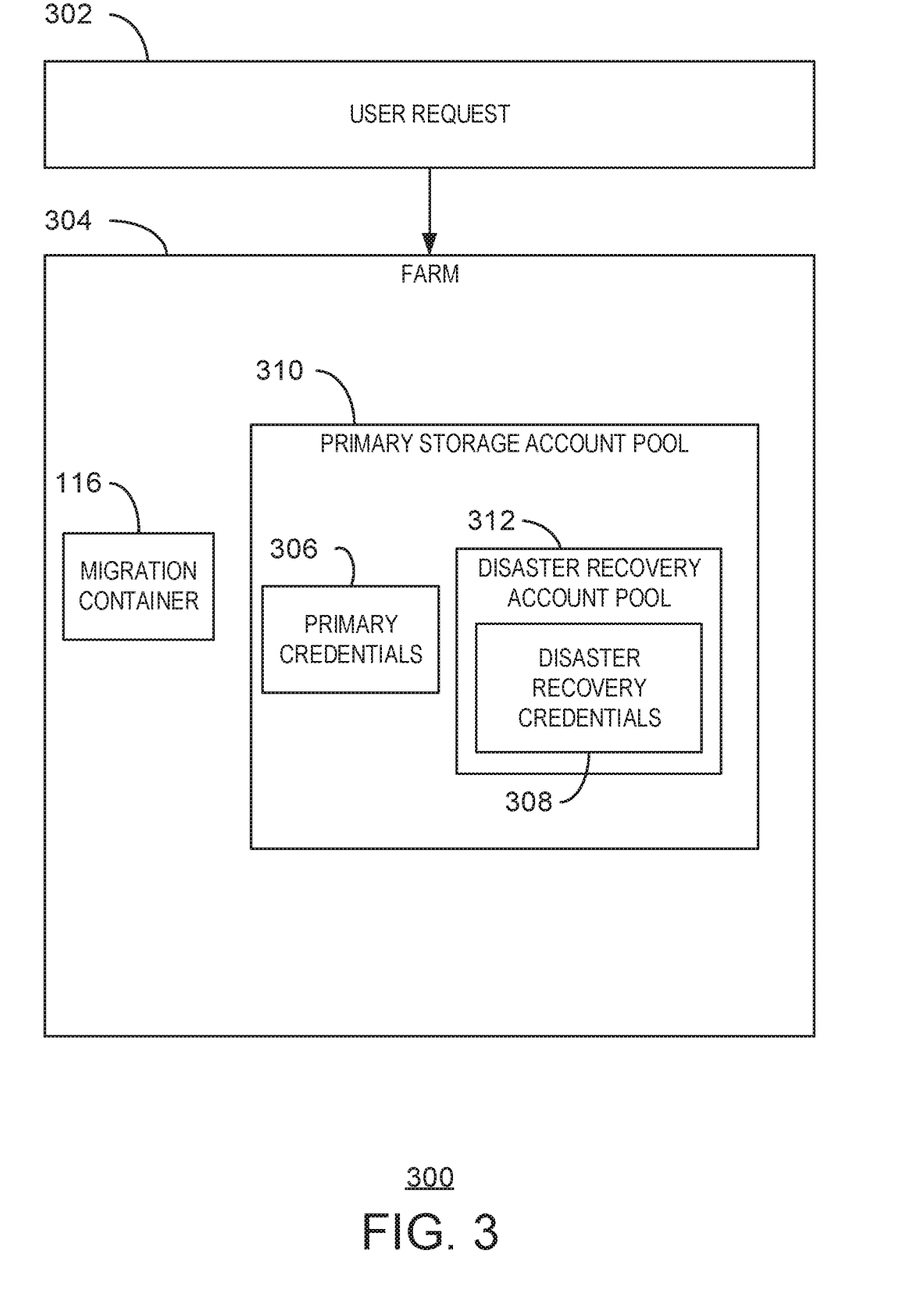
FIG. 3 shows a schematic diagram of an example process 300 for disaster recovery using the migration containers.

FIG. 3 shows a schematic diagram of an example process 300 for disaster recovery using the migration containers. As discussed above, the farm can be a logical collection of resources in a cloud-based system. A cloud-based service can operate and manage a farm to implement a migration container or a migration cloud-based management system as described in FIG. 1 and FIG. 2. As shown and described with reference to FIG. 3, any farm will continuously have primary and disaster recovery side credentials regardless of the current active farm. In an example, a farm can use its primary credentials for provisioning the resources. Because a farm has access both primary and disaster recovery side for verification, it is possible to submit jobs using resources that were provisioned from the other side.

In response to a user request 302 a farm 304 can have different responses depending on the state it is in, for example if it is in a normal state or a disaster recovery state. The farm 304 can also have a different response depending on when in the process a disaster recovery event occurs. For example, varying outcomes can occur if the farm 304 switches to a disaster recovery state before a user request 302 is received, after a migration container 116 has been provisioned, and other relative times.

For example, a farm in normal operation mode has access to primary credentials 306 for providing a migration container 116 as well as disaster recovery credentials 308. When prompted, the farm can provision the migration container 116 using primary credentials 306 from a primary storage account pool 310. The primary storage account pool 310 can be a collection of resources for providing the paths and credentials for a migration container 116 in response to a user request 302.

In response to a job being submitted, a farm in normal operation mode checks the primary account storage pool based on the user's storage account name provided in the migration containers and will fetch corresponding credentials from primary credentials 306.

In an example when a farm can fail over to a disaster recovery mode after the farm has already provisioned a migration container 116 in response to a user request 302, but before a migration job is submitted. When a farm 304 is in disaster recovery mode, access is still available to the primary credentials 306 and the disaster recovery credentials 308, even though additional migration containers 116 may not be provisioned in this mode. When the migration job is submitted by a user request 302, the farm in a disaster mode can still check the storage account name provided in the migration container 116 in the migration job request. The farm can respond to the migration job request by fetching corresponding credentials from its disaster recovery credentials 308, which may be a part of the primary storage account pool 310 of the farm.

In an example, a farm 304 can fail over to disaster recovery and provisions the container and job has been submitted while in disaster recovery. When a farm 304 has failed over, the farm 304 can still provision a migration container 116 using its primary pool and can provide resources from the disaster recovery account pool 312.

Figure 4:
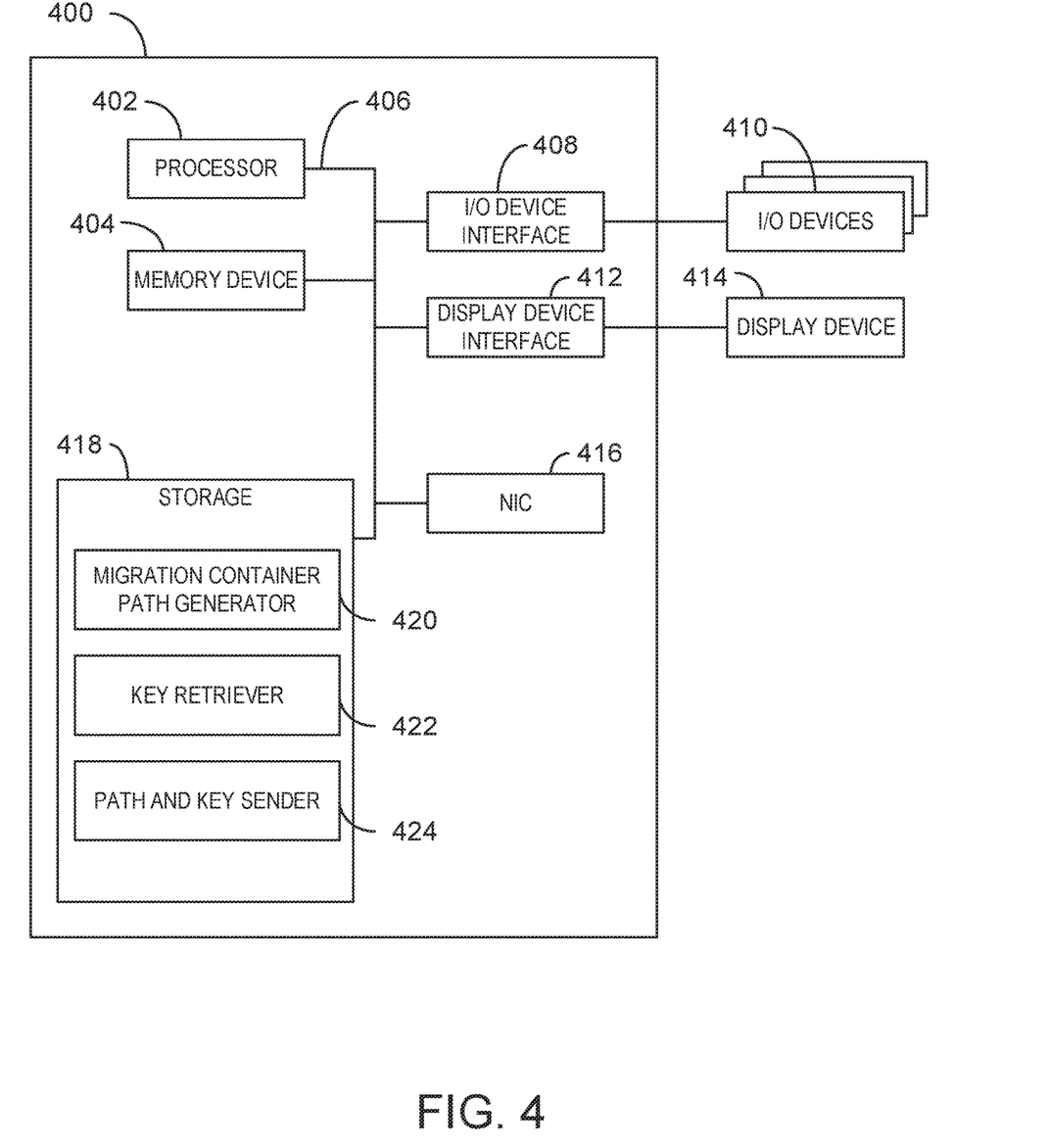
FIG. 4 is a block diagram of an example of a computing system for provisioning migration containers.

FIG. 4 is a block diagram of an example of a computing system for provisioning migration containers. The computing system 400 may be, for example, a mobile phone, laptop computer, desktop computer, or tablet computer, among others. The computing system 400 may include a processor 402 that is adapted to execute stored instructions, as well as a memory device 404 that stores instructions that are executable by the processor 402. The processor 402 can be a single core processor, a multi-core processor, a computing cluster, or any number of other configurations. The memory device 404 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 402 may be connected through a system bus 406 (e.g., PCI, ISA, PCI-Express, NuBus, etc.) to an input/output (I/O) device interface 408 adapted to connect the computing system 400 to one or more I/O devices 410. The I/O devices 410 may include, for example, a keyboard, a gesture recognition input device, a voice recognition device, and a pointing device, wherein the pointing device may include a touchpad or a touchscreen, among others. The I/O devices 410 may be built-in components of the computing system 400, or may be devices that are externally connected to the computing system 400.

The processor 402 may also be linked through the system bus 406 to a display device interface 412 adapted to connect the computing system 400 to a display device 414. The display device 414 may include a display screen that is a built-in component of the computing system 400. The display device 414 may also include a computer monitor, television, or projector, among others, that is externally connected to the computing system 400. A network interface card (NIC) 416 may also be adapted to connect the computing system 400 through the system bus 406 to a network (not depicted).

The storage 418 can include a hard drive, an optical drive, a USB flash drive, an array of drives, or any combinations thereof. The storage 418 may include a migration container path generator 420, a key retriever 422, and a path and key sender 424. The migration container path generator 420 can generate a migration container path from a hash of a received container creation key, wherein the hash of the container creation key is to be generated and sent for storage in a migration container metadata. The key retriever 422 can, in response to a received migration container request from the user device, retrieve a migration container modification key. The path and key sender 424 can send the migration container modification key and the migration container path to a user device.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.).

Figure 5:
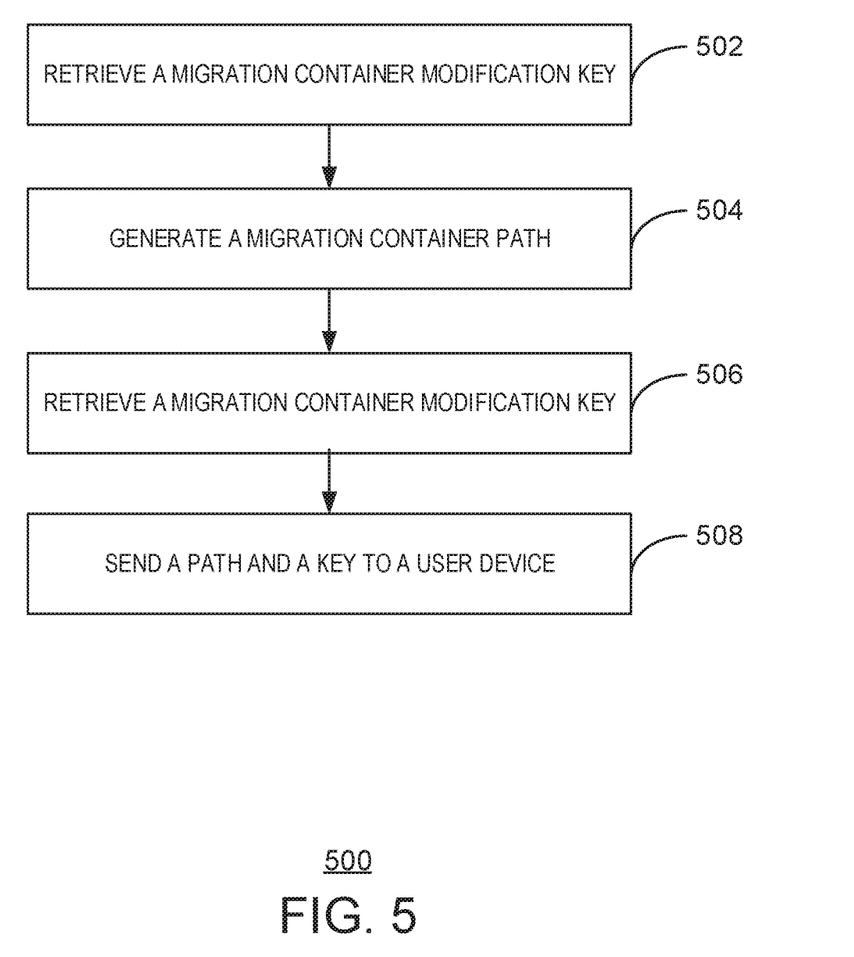
FIG. 5 is a process flow diagram of an example process for provisioning migration containers.

FIG. 5 is a process flow diagram of an example process for provisioning migration containers. The method 500 can be implemented with any suitable computing device, such as the computing system 400 of FIG. 4. Like numbered items are as described in FIG. 4.

At block 502, the method includes processing a received container creation key. At block 504, the method includes generating a migration container path from a hash of the container creation key, where the hash of the container creation key is to be stored in a migration container metadata. In an example, the migration container path is generated prior to a request from the user device. The method can also include sending a lifespan of a migration container for storage to the migration container metadata of the migration container. In an example, the migration container metadata becomes immutable in response to storage of the hash of the container creation key.

At block 506, the method includes retrieving a migration container modification key in response to a received migration container request from a user device. At block 508, the method includes sending the migration container path, a migration container modification key to the user device.

In an example, the method can also include providing a migration queue path in response to a request from the user device. The method can also include indicating a path to a migration container located in the same geographic region as a user account, in response to the request from the user device including the user account with geolocation information. The method can include barring a user device from sending data across the migration container path unless the data is encrypted with a key matching the hash of the container creation key.

Figure 6:
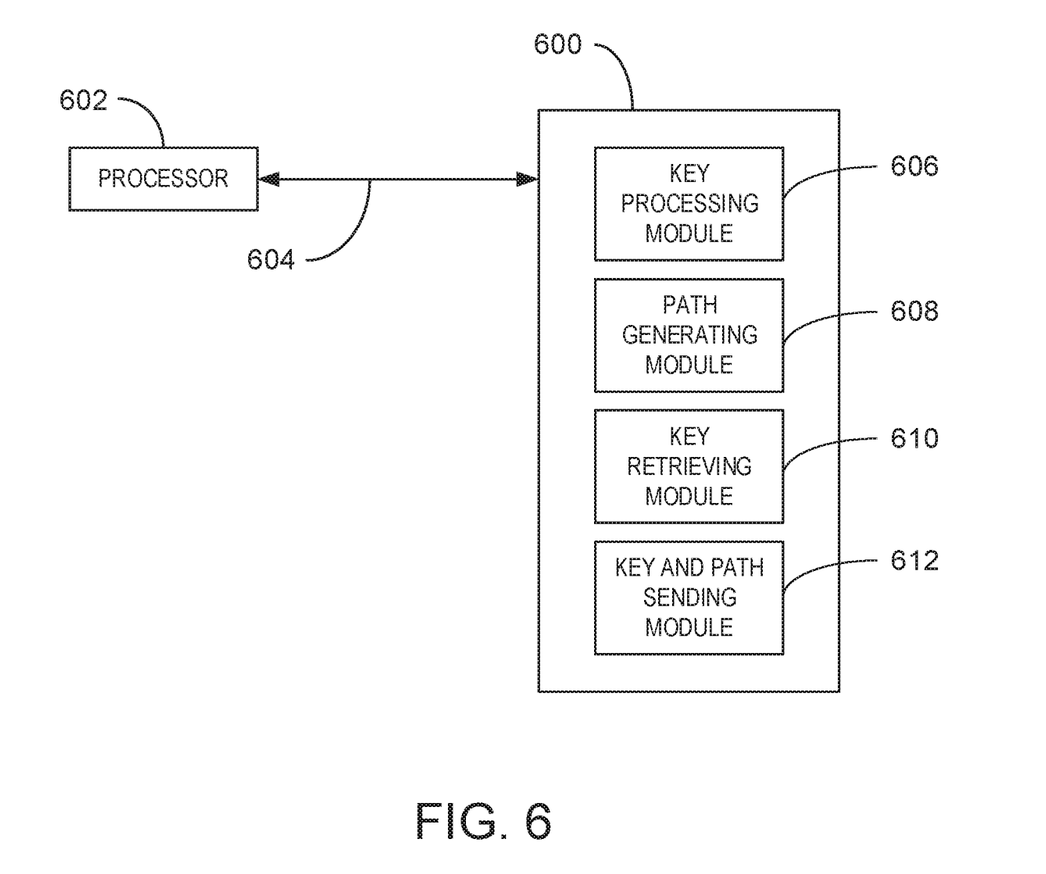
FIG. 6 is block diagram of an example computer-readable storage media for provisioning migration containers.

FIG. 6 is block diagram of an example computer-readable storage media for provisioning migration containers. The tangible, computer-readable storage media 600 may be accessed by a processor 602 over a computer bus 604. Furthermore, the tangible, computer-readable storage media 600 may include code to direct the processor 602 to perform the steps of method discussed in relation to FIG. 5.

The various software components discussed herein may be stored on the tangible, computer-readable storage media 600, as indicated in FIG. 6. For example, the tangible computer-readable storage media 600 can include a Key processing module 606 to process a received container creation key. The tangible computer-readable storage media 600 can include a path generating module 608 to generate a migration container path from a hash of the container creation key, where the hash of the container creation key is to be stored in a migration container metadata. In an example, the migration container path is generated prior to a request from the user device. The tangible computer-readable medium can also include instructions that when executed on a processor send a lifespan of a migration container for storage to the migration container metadata of the migration container. In an example, the migration container metadata becomes immutable in response to storage of the hash of the container creation key.

The tangible computer-readable storage media can also include a key retrieving module 610 to retrieve a migration container modification key in response to a received migration container request from a user device. In an example, the service bus can alert the farm based on the temperature of the farm. The tangible computer-readable storage media can also include a key retrieving module 610 to send the migration container path, a migration container modification key to the user device.

In an example, the tangible computer-readable storage media can also include instructions that when executed on a processor provide a migration queue path in response to a request from the user device. The tangible computer-readable storage media can also include instructions that when executed on a processor indicate a path to a migration container located in the same geographic region as a user account, in response to the request from the user device including the user account with geolocation information. The tangible computer-readable storage media can also include instructions that when executed on a processor bar a user device from sending data across the migration container path unless the data is encrypted with a key matching the hash of the container creation key.

It is to be understood that any number of additional software components not shown in FIG. 6 may be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLES

Example 1

Example 1 is a system for provisioning a migration container. The example system for provisioning a migration container includes a memory and a processor to generate a migration container and migration metadata, the migration container to store data verified as encrypted with an encryption key, the migration metadata comprising a lifespan value indicating a time limit for the migration container; in response to a request from a user device, provide the encryption key and a migration container path corresponding to a location of the migration container to the user device; store data in the migration container in response to detecting the data from the user device via the migration container path; migrate the data in the migration container to a server; and delete the migration container in response to the time limit of the lifespan value being exceeded.

Example 2

Example 2 includes the system for provisioning a migration container of Example 1, including or excluding optional features. In this example, the migration container path is generated prior to a request from the user device.

Example 3

Example 3 includes the system for provisioning a migration container of Example 1, including or excluding optional features. In this example, the processor provides a migration queue path in response to a request from the user device.

Example 4

Example 4 includes the system for provisioning a migration container of Example 1, including or excluding optional features. In this example, a lifespan of a migration container is sent for storage to the migration container metadata of the migration container.

Example 5

Example 5 includes the system for provisioning a migration container of Example 1, including or excluding optional features. In this example, the migration container path indicates a path to a migration container located in the same geographic region as a user account, in response to the request from the user device including the user account with geolocation information.

Example 6

Example 6 includes the system for provisioning a migration container of Example 1, including or excluding optional features. In this example, the migration container metadata becomes immutable in response to storage of the hash of the container creation key.

Example 7

Example 7 includes the system for provisioning a migration container of Example 1, including or excluding optional features. In this example, a user device is barred sending data across the migration container path unless the data is encrypted with a key matching the hash of the container creation key.

Example 8

Example 8 is a method for provisioning a migration container. The example method for generating a migration container and migration metadata, the migration container to store data verified as encrypted with an encryption key, the migration metadata comprising a lifespan value indicating a time limit for the migration container; in response to a request from a user device, providing the encryption key and a migration container path corresponding to a location of the migration container to the user device; storing data in the migration container in response to detecting the data from the user device via the migration container path; migrating the data in the migration container to a server; and deleting the migration container in response to the time limit of the lifespan value being exceeded.

Example 9

Example 9 includes the provisioning a migration container method of Example 8, including or excluding optional features. In this example, the migration container path is generated prior to a request from the user device.

Example 10

Example 10 includes the provisioning a migration container method of Example 8, including or excluding optional features. This example include providing a migration queue path in response to a request from the user device notification.

Example 11

Example 11 includes the provisioning a migration container method of Example 8, including or excluding optional features. This example includes sending a lifespan of a migration container for storage to the migration container metadata of the migration container.

Example 12

Example 12 includes the provisioning a migration container method of Example 8, including or excluding optional features. This example includes indicating a path to a migration container located in the same geographic region as a user account, in response to the request from the user device including the user account with geolocation information.

Example 13

Example 13 includes the provisioning a migration container method of Example 8, including or excluding optional features. In this example, the migration container metadata becomes immutable in response to storage of the hash of the container creation key.

Example 14

Example 14 includes the provisioning a migration container method of Example 8, including or excluding optional features. This example including barring a user device from sending data across the migration container path unless the data is encrypted with a key matching the hash of the container creation key.

Example 15

Example 15 is a tangible, computer-readable medium that can include instructions that, in response to an execution by a processor generate a migration container and migration metadata, the migration container to store data verified as encrypted with an encryption key, the migration metadata comprising a lifespan value indicating a time limit for the migration container; in response to a request from a user device, provide the encryption key and a migration container path corresponding to a location of the migration container to the user device; store data in the migration container in response to detecting the data from the user device via the migration container path; migrate the data in the migration container to a server; and delete the migration container in response to the time limit of the lifespan value being exceeded.

Example 16

Example 16 includes the computer-readable medium of Example 15, including or excluding optional features. In this example, the migration container path is generated prior to a request from the user device.

Example 17

Example 17 includes the computer-readable medium of Example 15, including or excluding optional features. In this example, provide a migration queue path in response to a request from the user device.

Example 18

Example 18 includes the computer-readable medium of Example 15, including or excluding optional features. In this example, a lifespan of a migration container is sent for storage to the migration container metadata of the migration container.

Example 19

Example 19 includes the computer-readable medium of Example 15, including or excluding optional features. In this example, the migration container path indicates a path to a migration container located in the same geographic region as a user account, in response to the request from the user device including the user account with geolocation information.

Example 20

Example 20 includes the computer-readable medium of Example 15, including or excluding optional features. In this example, the migration container metadata becomes immutable in response to storage of the hash of the container creation key.

What is claimed is:

1. A system for provisioning a migration container comprising:
a processor; and
a memory storing instructions that, when executed on the processor, cause the processor to:
generate a migration container, a first encryption key, and migration metadata, the migration container to store data verified as encrypted with the first encryption key, the migration metadata comprising a first hash of the first encryption key and a lifespan value indicating a time limit for the migration container;
in response to a request from a user device for an upload of data, provide the first encryption key and a migration container path corresponding to a location of the migration container to the user device;
in response to the user device initiating the upload of the data and prior to receiving the data, receive a second encryption key from the user device, generate a second hash from the second encryption key, and compare the first hash with the second hash to verify that the data is encrypted with the first encryption key, wherein the user device is barred from sending the data across the migration container path if the first hash does not match the second hash;
store the data in the migration container in response to detecting the data from the user device via the migration container path;
migrate the data in the migration container to a server; and
delete the migration container in response to completion of data migration from the migration container to the server.

2. The system of claim 1, wherein the migration container path is generated prior to a request from the user device.

3. The system of claim 1, wherein the processor provides a migration queue path in response to a request from the user device.

4. The system of claim 1, wherein a lifespan of a migration container is sent for storage to the migration metadata of the migration container.

5. The system of claim 1, wherein the migration container path indicates a path to a migration container located in the same geographic region as a user account, in response to the request from the user device including the user account with geolocation information.

6. The system of claim 1, wherein the migration metadata becomes immutable in response to storage of a hash of a container creation key.

7. A method for provisioning a migration container comprising:
generating a migration container, a first encryption key, and migration metadata, the migration container to store data verified as encrypted with the first encryption key, the migration metadata comprising a first hash of the first encryption key and a lifespan value indicating a time limit for the migration container;

in response to a request from a user device for an upload of data, providing the first encryption key and a migration container path corresponding to a location of the migration container to the user device;

in response to the user device initiating the upload of the data and prior to receiving the data, receive a second encryption key from the user device, generate a second hash from the second encryption key, and compare the first hash with the second hash to verify that the data is encrypted with the first encryption key, wherein the user device is barred from sending the data across the migration container path if the first hash does not match the second hash;

storing the data in the migration container in response to detecting the data from the user device via the migration container path;

migrating the data in the migration container to a server; and deleting the migration container in response to completion of data migration from the migration container to the server.

8. The method of claim 7, wherein the migration container path is generated prior to a request from the user device.

9. The method of claim 7, comprising providing a migration queue path in response to a request from the user device.

10. The method of claim 7, comprising sending a lifespan of a migration container for storage to the migration metadata of the migration container.

11. The method of claim 7, comprising indicating a path to a migration container located in the same geographic region as a user account, in response to the request from the user device including the user account with geolocation information.

12. The method of claim 7, wherein the migration metadata becomes immutable in response to storage of a hash of a container creation key.

13. One or more of a hard disk, an optical disk, or a flash memory, comprising instructions that, in response to an execution by a processor, cause the processor to:

generate a migration container, a first encryption key, and migration metadata, the migration container to store data verified as encrypted with the first encryption key, the migration metadata comprising a first hash of the first encryption key and a lifespan value indicating a time limit for the migration container;

in response to a request from a user device for an upload of data, provide the first encryption key and a migration container path corresponding to a location of the migration container to the user device;

in response to the user device initiating the upload of the data and prior to receiving the data, receive a second encryption key from the user device, generate a second hash from the second encryption key, and compare the first hash with the second hash to verify that the data is encrypted with the first encryption key, wherein the user device is barred from sending the data across the migration container path if the first hash does not match the second hash;

store the data in the migration container in response to detecting the data from the user device via the migration container path;

migrate the data in the migration container to a server; and delete the migration container in response to completion of data migration from the migration container to the server.

14. The one or more of a hard disk, an optical disk, or a flash memory of claim 13, wherein the migration container path is generated prior to a request from the user device.

15. The one or more of a hard disk, an optical disk, or a flash memory of claim 13, comprising instructions that, in response to execution by the processor, direct the processor to provide a migration queue path in response to a request from the user device.

16. The one or more of a hard disk, an optical disk, or a flash memory of claim 13, wherein a lifespan of a migration container is sent for storage to the migration metadata of the migration container.

17. The one or more of a hard disk, an optical disk, or a flash memory of claim 13, wherein the migration container path indicates a path to a migration container located in the same geographic region as a user account, in response to the request from the user device including the user account with geolocation information.

18. The one or more of a hard disk, an optical disk, or a flash memory of claim 13, wherein the migration metadata becomes immutable in response to storage of the hash of the container creation key.

* * * * *